United States Patent [19]

Demuth et al.

[11] 4,140,042
[45] Feb. 20, 1979

[54] APPARATUS FOR MACHINING GEAR TOOTH FLANKS

[75] Inventors: Walter Demuth, Wallisellen; Rene Scheidegger, Wettswil, both of Switzerland

[73] Assignee: Maag Gear-Wheel & Machine Company Limited, Zurich, Switzerland

[21] Appl. No.: 796,717

[22] Filed: May 13, 1977

[30] Foreign Application Priority Data

May 18, 1976 [CH] Switzerland .......................... 6154/76

[51] Int. Cl.² ............................................. B23F 19/06
[52] U.S. Cl. ....................................... 90/1.6 R; 90/2
[58] Field of Search ..................... 90/2, 1.6; 51/100 R

[56] References Cited

U.S. PATENT DOCUMENTS

| 2,392,819 | 1/1946 | Gruenberg et al. | 90/100 R |
| 3,096,685 | 7/1963 | Demuth | 90/1.6 |

Primary Examiner—Frank T. Yost
Attorney, Agent, or Firm—Toren, McGeady and Stanger

[57] ABSTRACT

Apparatus for machining gear teeth has a template control arrangement for varying the tooth flank shape longitudinally of the flanks. This arrangement comprises co-operating wedges, one fixed to the machining tool and the other to a moving tool carrier that makes the working stroke of the tool, the tool being displaceable relative to the carrier by the wedges to vary the tool position radially of the workpiece as it moves along the flanks. The carrier wedge slides in the carrier transversely to the working strokes and the template follower is fixed to slide with it, whereby the variation of the tool radial position is directly proportional to the template profile.

3 Claims, 5 Drawing Figures

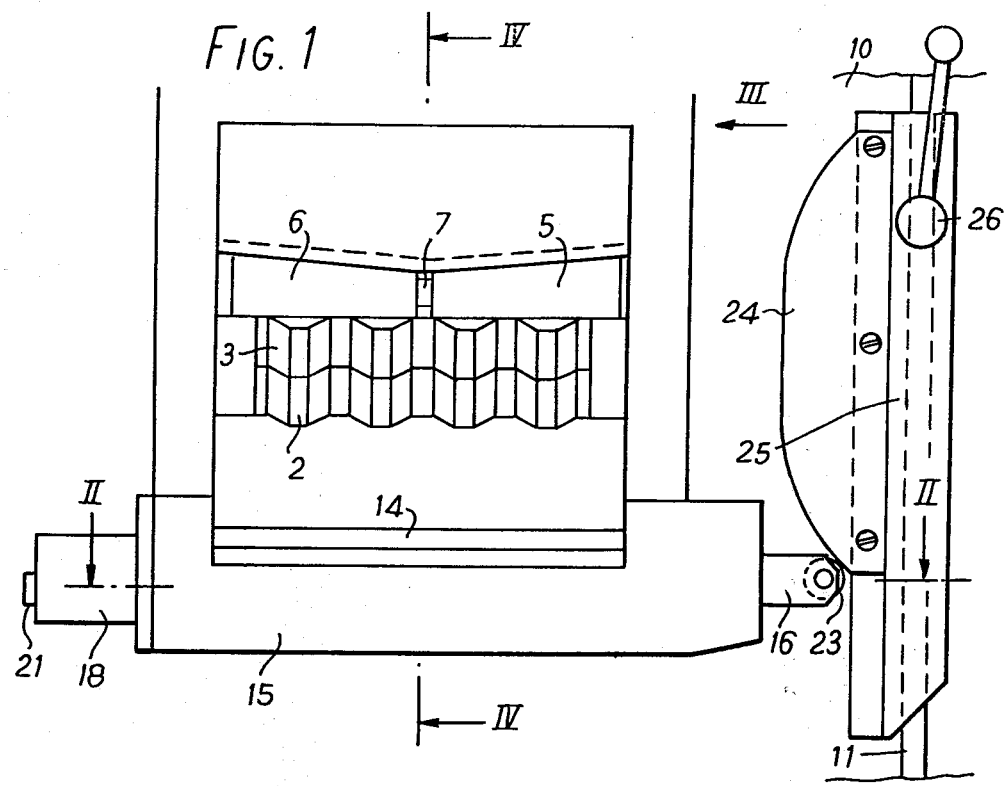
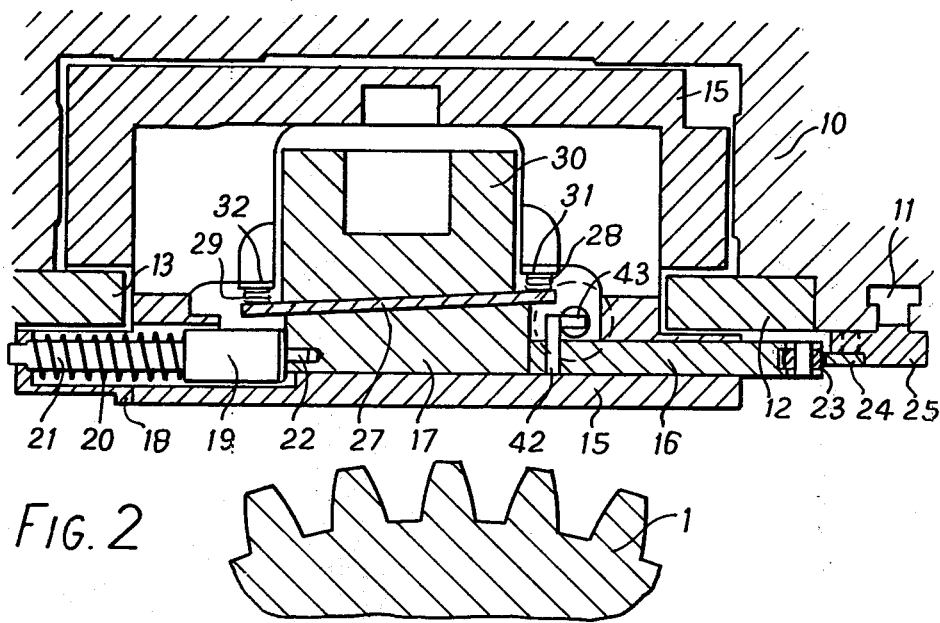

APPARATUS FOR MACHINING GEAR TOOTH FLANKS

BACKGROUND OF THE INVENTION

The invention relates to an apparatus which is provided in a machine tool for machining gear teeth for the purpose of achieving a tooth flank shape differing from the theoretical shape in the longitudinal direction of the teeth.

An apparatus of this kind for correcting the tooth flanks in their longitudinal direction, for example to a crowned or conical shape, by varying the radial distance of the tool from the workpiece with the aid of a template during the movement of the tool along the tooth has been disclosed in U.S. Pat. No. 3,096,685, in which a template is in contact with a rocker lever which transmits the movement to a threaded spindle and the latter transmits the movement to a wedge slide and to the tool carrier and thus to the tool.

Through the provision of the rocker lever the contours of the template are not reproduced to scale, that is to say in a predetermined ratio, but in a continuously varying ratio, so that for example the desired crowning of the tooth flank cannot be provided on the template simply with an increase of scale (in a fixed ratio) but is determined in a relatively complicated manner in consequence of the changing angular position of the rocking lever in relation to the template at any moment and of the distance between the sensing roller from the centre of rotation of the rocker lever.

An apparatus for producing crowned tooth flanks for bevel gears is also known (DT-PS 855, 495) in which during the longitudinal movement of the tool, wedge-shaped rails are mounted for sliding along a guide surface and the reciprocating movement of the bars for controlling the correction of the tooth flank is derived from a crank drive. Although this arrangement enables the magnitude and position of the crowning to be adjusted, the exact nature of the crowning cannot be adjusted as with a template.

In addition, a gear grinding machine is known (US PS 2, 392, 819) in which for the purpose of producing a deviation from the theoretical longitudinal shape of the tooth, use is made of a template which produces a pivoting motion of a follower fixed to the tool carrier and as in the first-mentioned apparatus has an indirect relationship between the template profile and the tool displacement. In any case, in the grinding of gears much smaller forces occur than, for example, in the planing of gears, this apparatus is suitable only for restricted applications, as in the grinding of gears where there is also only a very slow movement along the template. A rapid but nevertheless accurate cutting sequence with relatively great cutting forces, such as is necessary particularly for gear planing machines, is not possible when this known apparatus is used.

SUMMARY OF THE INVENTION

The problem underlying the invention is that of eliminating the disadvantages of these earlier constructions so that a template can be produced in a fixed predetermined scale on the basis of the desired flank shape. This is achieved according to the invention by mounting in a movable tool carrier a wedge slide mounted for movement transverse to the movement of the carrier and having a roller which bears on the template fastened on a stationary part of the machine tool, the wedge slide acting on a correcting wedge to swivel the cutting tool and thus vary the radial distance between the tool and the workpiece.

BRIEF DESCRIPTION OF THE DRAWINGS

The following Figures show by way of example and diagrammatically apparatus according to the invention in a gear planing machine for cylindrical gears:

FIG. 1 is a front view of the tool carrier and template;

FIG. 2 a horizontal section on the line II—II in FIG. 1 or in FIG. 4;

DESCRIPTION OF THE PREFERRED EMBODIMENT

Figure 3:
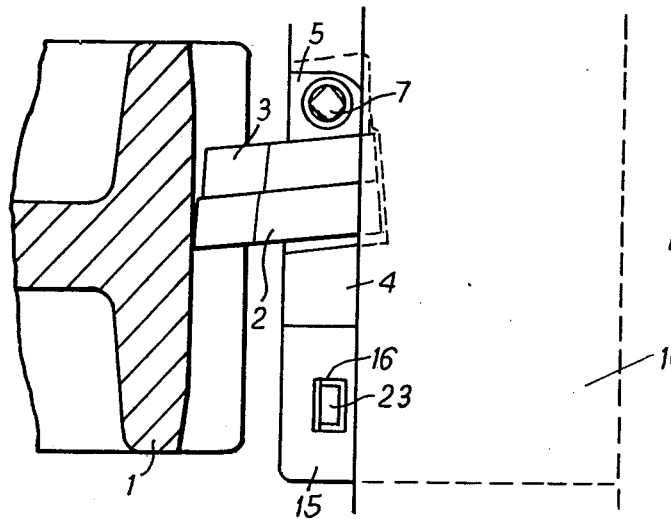
FIG. 3 is a side view in the direction III of the tool carrier shown in FIG. 1 and a vertical section through the workpiece.
Figure 4:
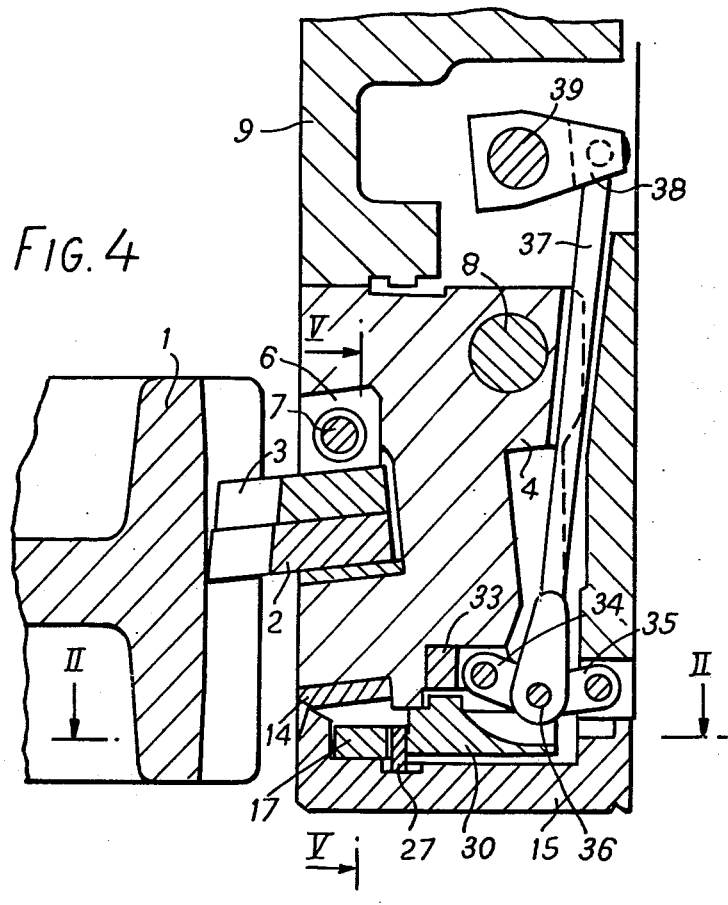
FIG. 4 is a vertical section on the line IV—IV in FIG. 1.
Figure 5:
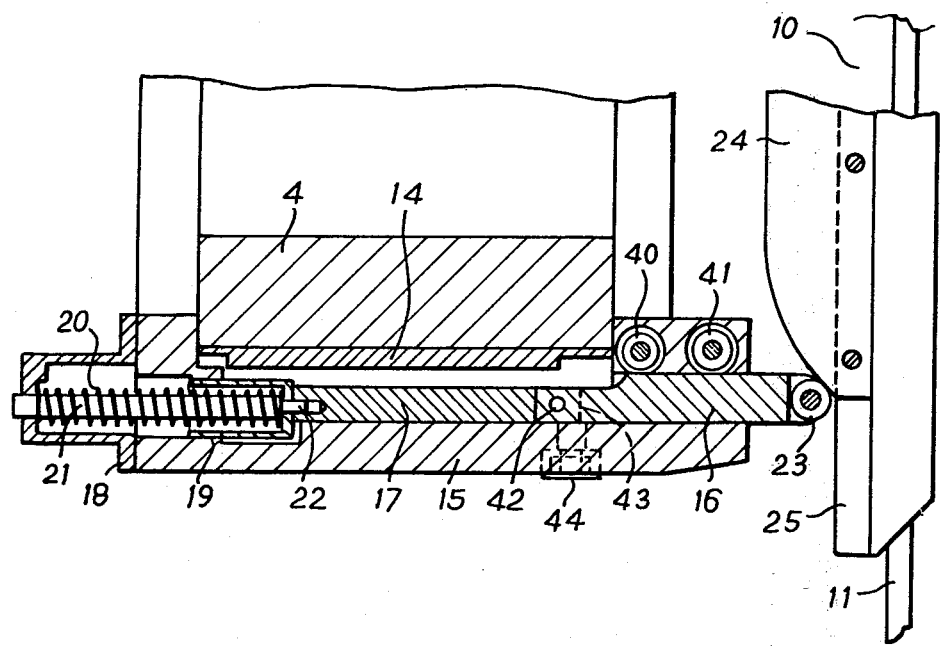
FIG. 5 a partial vertical section on the line V—V in FIG. 4.

The gear 1 to be produced in clamped as workpiece on a circular table having a vertical axis. The table is not shown here but further details of it and other parts of the machine tool not described and illustrated herein can be ascertained from the disclosure in U.S. Pat. No. 3,096,685. A rack type cutter 2 used as tool, stiffened by a support 3, is fastened together with the latter in the hinged tool holder or clapper 4 with the aid of two wedges 5 and 6, which are drawn towards one another by tensioning screw 7. The tool clapper 4 is mounted in vertical tool carrier 9 for pivoting about the axis of shaft 8. The tool carrier 9 serves as mounting for the tool clapper 4 and is slidable in carriage guides on the gear planing machine 10 (not further shown). The gear planing machine 10 has a T-slot 11. Two rails 12 and 13 guide the tool carrier 9 and are themselves fastened on the machine 10. A cover strip 14 is fastened by means of screws on the tool clapper 4, while cover plate 15 closes the gap against the tool clapper 4 and the cover strip 14. The cover plate 15 is screwed to the tool carrier 9.

A slide 16 and a wedge 17 are guided for transverse movement in the cover plate 15. In addition, a flange 18 is fastened in the cover plate 15, in which a spring sleeve 19, which contains a spring 20 and a guide pin 21, is mounted for axial displacement; stud 22 of the guide pin 21 projects into the wedge 17. On the slide 16 is mounted a roller 23 which is pressed by the spring 20 against a template 24. The template is fastened on the template carrier 25, which in turn is clamped by means of a lever 26 so as to be slidable in the T-slot 11.

An intermediate plate 27 lies against the taper face of the wedge 17 and is pressed against that face by means of springs 28 and 29. At the same time this intermediate plate lies against a counter-wedge 30. The springs 28 and 29 are mounted on supports 31 and 32 joined to the cover plate 15.

On the tool clapper 4 is also fastened a carrier 33 in which one lever of a pair of toggle levers 34, 35 is mounted. The second lever 35 of the pair of toggle levers is pivoted on the tool carrier 9. The middle joint 36 of the two toggle levers 34 and 35 is joined to a rod 37, which in turn is pivotally connected to a lever 38. The lever 38 is connected by way of a friction clutch to a lift-off shaft 39 the latter having a gear (also not shown) which meshes with a rack fastened to the machine in known manner.

For the sake of better guidance the slide 16 is pressed by two rollers 40 and 41 against the cover plate 15. In addition, a pin 42 is provided on the slide 16, while in the cover plate 15 there is rotatably mounted a flattened shank pin 43 which by means of its hexagon socket 44 can be brought by hand into two different positions.

In the planing of gearing the tool carrier 9 together with the tool clapper 4, and thus also with the rack type cutter 2 serving as tool, is moved up and down along the tooth width of the workpiece 1. A gear on the tool lift-off shaft 39 rolls over a rack fastened on the machine, as described and illustrated in U.S. Pat. No. 3,096,685, and has the effect that the lever 38, which is connected by a friction clutch to the tool lift-off shaft 39 and whose angular deflections are limited by stops (not shown), is situated in an upper position during the downward movement or working stroke and in a lower position during the upwards movement or return stroke. The rod 37 makes the same movement, so that the rack type tool 2 is forced towards the workpiece during the working stroke in the course of the planing operation, through the action of the toggle levers 34 and 35, and is lifted off during the return stroke. Thereby the tool clapper 4 together with the tool 2 is swivelled about the axis of the shaft 8.

During the rough machining of the gearing the template 24 is removed and the flattened pin 43 turned 90° in relation to the position shown in FIG. 2 of the drawings. Through the pressure of the spring 20 the wedge 17 together with the slide 16 moves slightly to the right until the pin 42 encounters the flat end portion of the pin 43. A certain clearance is thus formed between the counter-wedge 30 and the intermediate plate 27, whereby the sliding surfaces of the wedge 17 are then loaded only by the pressure of the springs 28 and 29, but are no longer loaded by the far greater pressure applied by the tool clapper 4; these sliding surfaces are thus protected.

For the finish-machining of the workpiece the template 24 is fitted in the appropriate position and the flattened pin 43 brought into the position shown in the drawings. The clearance between the intermediate plate 27 and the correcting wedge 30 is thereby taken up.

The movement of the tool towards the workpiece during the working stroke is limited by means of the coacting wedge 30 which is fastened on the tool clapper 4 and which through the medium of the intermediate plate 27 strikes against the taper surface of the wedge 17. The position of the rack cutter 2 during the working stroke is thus also dependent on the axial position of the slide 16 and of the roller 23, the position of the latter being determined by the template 24. Since during the stroke of the rack cutter 2 the roller 23 also rolls over the template 24 under the pressure of the spring 20 and since the template 24 is stationary, each position of the rack cutter in respect of height or in relation to the tooth width corresponds to a predetermined position towards the workpiece independence upon the shape of the template. In the absence of a template or with only a short template the slide 16 is pressed against the pin 43, which thus limits the foremost working position of the tool.

The purpose of the limitation of the angular deflections of the lever 38 is to limit the lifting-off of the tool to a certain amount, while the feed of the rack cutter is limited by the counter-wedge 30. The lifting-off of the tool, as such, thus takes place independently of the working position of the tool at the moment in question.

The various working positions of the rack cutter 2 in relation to the gear 1 being machined also correspond to different centre distances in relation to the gear in the course of the tooth width. With a constant centre distance of the tool 2 axially parallel tooth flanks are obtained, while deviations of this centre distance in dependence on the template 24 in the course of the tooth width give rise to corresponding deviations of the tooth flanks. So-called crowned tooth flanks are very frequently produced with the apparatus of the invention; on the other hand it is also possible without difficulty to produce negatively crowned tooth flanks or slightly conical gears, while any other desired deviation from the theoretical shape is also possible, the template in all these cases being produced directly in a predetermined ratio, that is to say with a predetermined rise in relation to the desired flank deviation.

In the production of cylindrical gears with helical gearing the direction of the tool carrier is adapted to the desired helix angle, the template and the remainder of the mechanism following this adjustment to the helix angle of the toothing.

What is claimed is:

1. In a gear working machine tool for forming the tooth flanks of spur and helical gear workpieces by movement along the tooth flanks of a tool secured to a tool holder mounted on a tool carrier, and including means for producing deviations from the theoretical tooth shape along the tooth width by means of a template varying the radial distance between the tool and the workpiece through displacement of the tool holder on the carrier by acting on a wedge slide that is displaceable by the template transversely to the displacement of the tool holder to cooperate with a member fixed to the tool holder, the improvement comprising a roller mounted on the wedge slide for following the template, an intermediate plate between the wedge slide and the cooperating member on the tool holder, said wedge slide acting through said intermediate plate on the cooperating member and resilient means holding said intermediate plate continuously in contact with the wedge slide.

2. In a machine tool for machining tooth flanks on spur and helical gear workpieces by movement, along the tooth flanks, of a tool secured to a tool holder mounted on a tool carrier, and producing deviations from the theoretical tooth shape along the tooth width by means of a template varying the radial distance between the tool and the workpiece by displacement of the tool holder on the carrier, the improvement comprising a wedge slide, means mounting said slide in the movable tool carrier for displacement relative to the carrier transversely to the direction of movement of the tool, a roller fixed to said slide for following the template, a counter-wedge connected to the tool holder and cooperating with the wedge slide for displacing the tool holder with said displacement of said slide to vary the radial spacing of the tool from the workpiece in direct dependence upon the form of the template, means for holding the wedge slide in an inoperative position out of cooperation with the counter-wedge, and resilient pressure means acting on the wedge slide for retaining it in said position.

3. A machine tool according to claim 2 wherein said resilient pressure means act on said wedge slide for urging it into cooperation with the template.

* * * * *